United States Patent [19]

Lewis et al.

[11] Patent Number: 5,137,964
[45] Date of Patent: Aug. 11, 1992

[54] VISUALLY IMAGEABLE POLYACETYLENE SALT DYES

[75] Inventors: David F. Lewis, Monroe, Conn.; John C. Hornby, Rutherford, N.J.

[73] Assignee: ISP Investments Inc., Wilmington, Del.

[21] Appl. No.: 670,623

[22] Filed: Mar. 18, 1991

[51] Int. Cl.⁵ .............................................. C08L 49/00
[52] U.S. Cl. ................................. 524/550; 526/285; 548/156
[58] Field of Search ................. 526/285; 524/550; 548/156

[56] References Cited

U.S. PATENT DOCUMENTS 5,004,671  4/1991  Nishimura et al. ............... 430/281
5,049,428  9/1991  Kanno et al. ..................... 428/913

Primary Examiner—Paul R. Michl
Assistant Examiner—Tae H. Yoon
Attorney, Agent, or Firm—Marilyn J. Maue; Joshua J. Ward

[57] ABSTRACT

This invention relates to novel thermochromic quaternized polyacetylene salt derivatives which are visually imageable by exposure to a light source generating energy in a wavelength of from about 400 nm to about 1500 nm said salt derivatives having a thermosensitivity of at least 50° C. and defined by the formula $$XV-C\equiv C)_nX'$$

or a homopolymer thereof wherein X is the N-quaternized monovalent radical of a dye having an optical absorbance in a wavelength of from about 400 nm to about 1500 nm; V is the cationic residue of a carboxyl, sulfonate, thioate, thiolic, thionic or phosphonate radical; n has a value of from 2 to 4 and X' is hydrogen, $C_4$ to $C_{25}$ alkyl, a polar hydrophilic group which promotes hydrogen bonding containing a radical of the group of an amino, amido, hydroxy, ester, ether, phenol, carboxy, halo, sulfonyl, sulfoxy, sulfinyl, silyl, silyoxy, phosphoro, phosphate, keto, carbamate, aldehyde, urea, urethane, a metal salt group or X' is selected from the group defined for X.

8 Claims, No Drawings

VISUALLY IMAGEABLE POLYACETYLENE SALT DYES

In one aspect the invention relates to a novel thermochromic polyacetylene derivative which is visually imageable by exposure to a source of energy transmitted at a wavelength of from about 400 nm to about 1,500 nm. In another aspect the invention relates to a recording film comprising a substrate coated with said thermochromic polyacetylene derivative and in still another aspect, to the process of imaging said polyacetylene derivative.

BACKGROUND OF THE INVENTION

Diacetylenic and other non-polymeric polyacetylenic compounds have been used as recording layers for optical discs and similar information storage devices. However, the development of a visual image requires exposure at short wavelengths, which excludes more economical and efficient laser imaging, since the polyacetylene compounds are generally incapable of absorbing energy and undergoing polymerization when exposed to light in the region above about 400 nm. Visual images are those images which are clearly recognizable by the human eye and are characterized by high optical contrast in one or more of the red, green and blue portions of the spectrum. By high optical contrast is meant an optical density difference of at least 1.0 between the maximum density and minimum density portions of the image, where optical density is defined as $\log_{10}(1/\text{transmittance})$ for transmitted light and $\log_{10}(1/\text{reflectance})$ for reflected light. Such visual imaging is significantly distinguished from prior data recording where image contrast is relatively low and not easily discernable by the human eye or without high magnification. In several cases laser imaging at wavelengths above 400 nm, based on the thermal color change of the polymeric polyacetylenic compound to develop a useful visual image, has been attempted, but it has been found that cumbersome high-output equipment, e.g. argon, metal-vapor or gas lasers and the like are required. Relatively low-output lasers, in the 650-1000 nm wavelength range, fail to imprint on either the polyacetylenes or their polymers, particularly in relatively thick layers required to produce useful visual images as opposed to the relatively thin layers needed for digital data recording. Accordingly, it is the aim of research, with consideration to cost performance and production efficiency, to provide an organic system most suitable for visual imaging and optical data recording, which is imageable at an output energy in the 650–1000 nm wavelength range characteristic of compact semi-conductor diode lasers.

It is an object of this invention to provide a thermochromic compound which answers the above needs and which is visually imageable by a compact semi-conductor laser or similar source of light emanation or by electron beam, and other sources of short wavelength radiation, by a simplified process which achieves high performance and high production efficiency while realizing significant cost savings.

Another object is to provide a visual imaging process involving exposure of a film to a source of energy generated in a wavelength of from about 400 nm and about 1500 nm which process provides the most efficient use of incident energy in an imaging process.

Another object of the invention is to provide an imageable thermosensitive polyacetylene derivative which is directly and visually imageable by light energy generated in wavelengths up to about 1,500 nm.

Still another object is to provide a visually imageable film which is stable to normal UV light exposure.

These and other objects of the invention will become apparent from the following description and disclosure.

THE INVENTION

In accordance with this invention there is provided a crystalline thermochromic recording compound having a thermal sensitivity above 50° C., preferably a sensitivity of at least about 80° C., which is defined by the formula $XV(C\equiv C)_n X'$ or a homopolymer thereof, wherein X is a monovalent radical of a dye having an optical absorbance within the range of from about 400 nm to about 1,500 nm wavelength; V is the cationic residue of a carboxyl, sulfonate, thioate, thiolic, thionic or phosphonate group; n has a value of from 2 to 4 and X' is selected from the group of a monovalent radicals defined for XV, hydrogen, $C_4$ to $C_{25}$ alkyl and a polar hydrophilic group capable of promoting hydrogen bonding.

The homopolymer of the above polyacetylene compound contains repeating units of

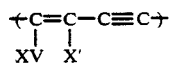

wherein X, V and X' are as defined. Specific examples wherein at least one of X and X' are the dye radicals include such radicals as a monovalent metal complex, for example a diimine iron complex, dithiol nickel complex, indigo, anthraquinone, azulenium, polycarbocyanine, squarylium, indolizinium, naphthalocyanine, naphthoquinone and its analogs, phthalocyanine, polymethine, pyrylium, thiapyrylium, telluropyrylium, triaryl ammonium, triquinocycloalkane, or a monovalent radical of the specific dyes disclosed in the Journal of Imaging Science, Volume 32, number 2, Mar./Apr. 1988, pages 51–56 (ORGANIC ACTIVE LAYER MATERIALS FOR OPTICAL RECORDING by James E. Kuder); Chemistry in Britain, Nov. 1986, pages 997–1000, entitled MODERN DYE CHEMISTRY by J. Griffiths; Angewandte Chemie, Volume 28, number 6, Jun. 1989, pages 677–828 (SEARCH FOR HIGHLY COLORED ORGANIC COMPOUNDS by Jurgen Fabian et al.); Journal of Imaging Technology, Volume 12, Number 3, Jun. 1986, pages 140–143, (ORGANIC MATERIALS FOR OPTICAL DATA STORAGE MEDIA - AN OVERVIEW by James E. Kuder), and Kirk-Othmer's Encyclopedia of Chemical Technology, Second Edition, Vol. 6, pages 605–609 and 611–624, all incorporated herein by reference. Specific examples of X' include the above described monovalent dye radicals, as well as hydrogen, $C_4$ to $C_{25}$ alkyl, and amino, amido, hydroxy, phenol, ester, ether, carboxy, halo, sulfonyl, sulfoxy, sulfinyl, silyl, silyoxy, phosphoro, phosphate, keto, carbonate, aldehyde, urea and urethane radicals and a metal salt group. It is to be understood that mixtures of the above polyacetylene dye derivatives can be employed as the imaging media. Of the crystalline polyacetylene dye compounds, the diacetylene dyes having absorption in the 650 to 900 nm wavelength are preferred. Most preferred are those wherein at least one of X and X' is a monovalent radical of a polycarbocyanine or squarylium dye. Mixtures of the above polyacetylene moieties with the corresponding moieties of the non-acetylenic dyes disclosed in the above references, or their mixtures, can also be used as the imaging composition in the recording film of the present invention.

The polyacetylene dyes can be prepared as a dispersion, emulsion or suspension, preferably as an aqueous dispersion suitable for coating on a substrate, or they can be applied to the substrate as a monomolecular film as formed by the Langmuir-Blodgette, spin coating or spray coating methods and the like.

As a guide for the selection of an X and/or X' radical having an energy absorbance in the wavelength to match that of a particular imaging device, the following table provides examples of wavelength absorption specific to the individual dye compounds. However, these are in no way limiting to the scope of suitable dye radicals which provide a desired energy absorbance in the polyacetylene derivatives of this invention.

TABLE

| X and/or X' Radicals of the Dyes | Wavelength Absorption |
| --- | --- |
| Aromatic annulenes | 768 nm |
| Al tetraazaporphyrins | 1204 nm |
| Ni dithiolenes | 1298 nm |
| Streptopolymethines | 1500 nm |
| Silenoxanthenylium | 802 nm |
| Azo | 778 nm |
| Indophenols and Analogues | 761 nm |
| Thermochromic dianthrone | 675 nm |
| Betaines | 934 nm |
| Divinyl benzothiazole | 640 nm |
| Trivinyl benzothiazole | 750 nm |
| Diethyl carbocyanine iodide | 700 nm | radiation energy in a wavelength of between about 400 and 1,500 nm or higher with a cationic, conjugated polyacetylene coreactant or a homopolymer thereof in the presence of a base catalyst. Stoichiometric amounts of the reactants or a slight excess of the dye component, up to about a 1.5 excess, are employed in the reaction. Suitable polyacetylene coreactants include those containing at least one functional carboxyl, sulfonate, phosphonate, thiolic, thionic or dithioate group. The process for preparing the reactive polyacetylene dye salt product is generally carried out at a temperature of between about 25° and about 100° C. at atmospheric pressure up to a pressure of about 50 psig; however the reaction is preferably effected at a temperature of from about 35° to about 70° C. The polyacetylene coreactant, in addition to the functional cationic group, may also contain a radical of the group amino, amido, hydroxy, ester, ether, phenol, carbamate, halo, sulfonyl, sulfoxy, sulfinyl, silyl, siloxy, phosphoro, phosphate, keto, aldehyde, urea and urethane. Of the above coreactants, diacetylenes having a functional carboxy group are preferred.

Specific examples suitable of polyacetylene coreactants include 2,4-hexadiyn-1-carboxyl-6-isopropyl carbamate, 3,5-octadiyn-1-methylsulfonate-8-(n-propyl urea), 10,12-pentacosadiyn-dioic acid, 2,4-hexadiyn-1-butyl thioic-8-(isopropyl carbamate), 2,5-octadiyn-1,8-bis(ethylthioate), 4,6-decadiynoic acid, 11,13-tetracosadiynoic acid, 10,12-docosadiynoic acid, and the like and homopolymers of these species.

A representative example of the reaction between a polycarbocyanine dye and a diacetylenic acid is illustrated by the equation

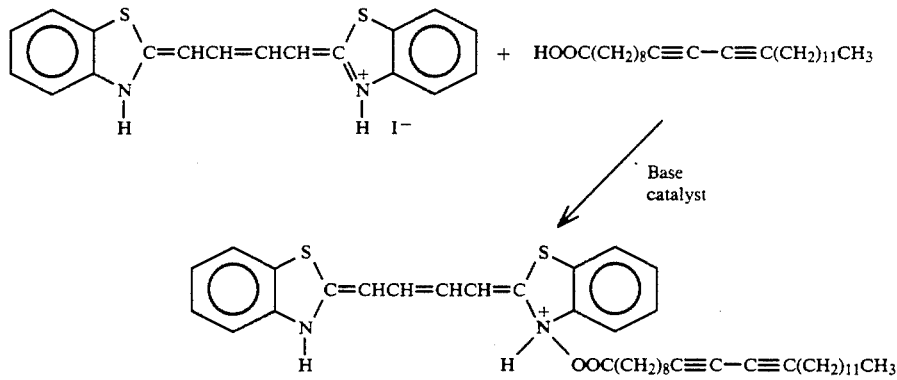

Preferred of the above compounds are the water soluble, nitrogen containing dyes, most preferably polycarbocyanine, squarylium, betain or aluminum tetraazaporphyrin dyes.

The polyacetylene dye derivatives of this invention have many advantages over prior polyacetylene imaging agents or mixtures in that they require less incident energy to achieve a color change and shorter exposure time can be used for a given amount of output power. Also, imaging of the present derivatives is accompanied with a reduced temperature rise in the matrix of the imaging layer which results in less image distortion. Upon imaging, the present polyacetylene dye compounds are capable of providing a peak optical density of between about 0.1 and about 5, preferably between about 0.5 and about 4.

The dye substituted polyacetylene salt compounds of this invention are prepared by reacting a complex, quaternized salt or anionic dye capable of absorbing The product is washed with water and is employed as fine crystals uniformly distributed in a coating composition. Coatings are most conveniently prepared from dispersions, emulsions or suspensions, preferably aqueous dispersions, of the monomeric or polymeric polyacetylene dye salt having an average particle diameter of between about 0.02 um and about 5 um, preferably between about 0.1 um and about 1 um.(*) Crystals of undesirable size can be reformed by ageing or chilling with water reconstituion to provide a dispersion of more uniform crystalline size within the desired range. Generally, the crystals are dispersed in a binder solution, preferably an aqueous binder solution, to provide a coating material containing from about 1 to about 50 wt. % solids, preferably from about 4 to about 20 wt. % solids. The resulting mixture is then coated and dried on a substrate. Suitable substrates include polyethylene terephthalate, nylon, polystyrene, cellulose acetate, cellulose nitrate, cellophane, polyvinyl chloride, polyvinylidene chloride, teflon, polychlorotrifluoro- ethylene, polyethylene, polypropylene, paper, ceramic, glass, metal, wood and the like.

"um" is used herein to define micrometre.

Exemplary of binder materials are natural and synthetic plastics, resins, waxes, colloids, gels and the like including gelatins, desirably photographic-grade gelatin, various polysaccharides including dextran, dextrin, hydrophilic cellulose ethers and esters, acetylated starches, natural and synthetic waxes including paraffin, beeswax, polyvinyl-lactams, polymers of acrylic and methacrylic esters and amides, hydrolyzed interpolymers of vinyl acetate and unsaturated addition polymerizable compounds such as maleic anhydride, acrylic and methylacrylic esters and styrene, vinyl acetate polymers and copolymers and their derivatives including completely and partially hydrolyzed products thereof, polyvinyl acetate, polyvinyl alcohol, polyethylene oxide polymers, polyvinylpyrrolidone, polyvinyl acetals including polyvinyl acetaldehyde acetal, polyvinyl butyraldehyde acetal, polyvinyl sodium-o-sulfobenzaldehyde acetal, polyvinyl formaldehyde acetal, and numerous other known photographic binder materials to form dispersed crystals of the thermosensitive crystalline polyacetylenic dye compound. As is well known in the art in the preparation of smooth uniform continuous coatings of binder materials, there may be employed therewith small amounts of conventional coating aids as viscosity controlling agents, surface active agents, leveling agents dispersing agents and the like.

Generally the speed of recording and density varies directly with the output power of the imaging device and the thickness of the coating. Accordingly, thin coatings of from about 0.02 to 100 micrometers, preferably from about 0.1 to 5 micrometer are recommended, whereupon the optical density change within the imaged area is from about 1.0 to greater than 5.0 density units and preferably from about 1.5 to about 4.5 density units.

The homopolymers of the polyacetylene in the polyacetylene dye products of this invention are generally colored compounds which strongly absorb laser radiation across a broad range of the spectrum, e.g. up to 1,500 nm, depending on the dye moiety of the compound. These products undergo an immediate and visually distinguishable color change in the discrete areas of laser emination impingement. On the other hand, although monomeric polyacetylenes of the polyacetylene dye products absorb radiation within the same broad spectrum, depending on the dye moiety, a latent image is transmitted by laser exposure in the exposed areas. This latent image is then visualized to a contrasting color by overall exposure to short wavelength radiation at 250–650 nm such as that generated by an electron beam, gamma-rays, beta-rays, alpha particles, X-rays, neutrons, UV light, etc., whereby the laser unexposed areas undergo a color change.

More specifically, recording on a film of this invention in a predetermined pattern or image is carried out by directing emanations from an energy source, operating in the wavelength of the polyacetylene dye absorbance capability, to impinge on specific discrete areas of the polyacetylene dye layer. In the case of the polyacetylene dye polymer, which is normally colored, exposure activates the polymeric moiety and the exposed areas undergo an immediate color change to provide a photopositive image. When the non-polymerized polyacetylene dye compound is employed, the polyacetylenic moiety is deactivated in the exposed areas and a latent image is encoded on the film which can be stored and subsequently converted to a visual photonegative image by exposing the entire polyacetylenic dye film to short wave radiation, thus causing a color change in the background of the latent image transmitted by the laser and creating a photonegative image.

It is desirable, particularly when recording visual images to select a polyacetylenic dye monomer or polymer which undergoes a yellow thermochromic change capable of absorbing blue light, since this color provides the highest contrast for duplication to other photosensitive recording media, particularly those containing photopolymers sensitive to blue and ultraviolet light as are commonly employed in commercial photolithographic printing plates and etch resists used in the preparation of printed circuit boards. However, polyacetylene dyes which are converted to other hues or hue intensities in the red, magenta, green, brown, blue and other color spectra all provide good image definition.

Lasers transmitting energy in the 400–1500 nm output range provide the highest image resolution, which is an important consideration in recording data transmissions. Within the output range of 600 to 900 nm, high speed can be achieved as well. For example using a laser beam diameter of 0.5 to 2 um, an exposure time of 180–250 ns/dot and output of 2.5–3.5 mW, an image is encoded on the polyacetylene dye which has excellent resolution and high color contrast.

The types of laser which are most suitably employed with the present polyacetylene dye compounds are those which generate energy in the 700–1500 nm wavelength and include compact semi-conductor, solid state, gas, metal-vapor, UV, and dye lasers. However, semiconductor diode lasers or solid state lasers are preferred and semi-conductor diode lasers are most preferred. Examples of suitable laser imaging devices which may be employed include a helium-neon laser, ruby laser, GaAlAs laser, neodynium yttrium aluminum garnet laser, argon laser, Nd(YAG) laser, and the like.

It is also within the scope of this invention to substitute laser emanations with other sources of light energy such as a xenon arc lamp, a mercury arc lamp, a tungsten-quartz lamp and the like which generate energy in the 600–1500 nm wavelength range.

The techniques of short and long wavelength exposures are well known, thus further amplification is not required. However, for illustrative purposes, it is preferable to choose a short wavelength exposure source capable of supplying between about 1 uW to 1 W of power to the imageable layer and to employ exposures of between about 1 mJ/cm$^2$ to about 10 J/cm$^2$.

Having thus described the invention, reference is now had to the following examples which illustrate preferred embodiments but which are not to be construed as limiting to the scope of the invention which is more broadly defined above and in the appended claims.

EXAMPLE 1

Preparation of a Polycarbocyanine Pentacosa Diynoic Acid Salt

Twenty grams of 10,12-pentacosadiynoic acid is melted at about 60° C. and the melted product intimately mixed with 3,3'-diethylthiatricarbocyanine iodide in a mole ratio of 1:1.3. About 0.05 moles of base catalyst, i.e. triethyl amine, is added to the mixture and the resulting composition stirred for 3 hours at 65° C. under atmospheric pressure. The mixture is then allowed to stand for 1 hour during which time it cools to room temperature and the desired crystalline 3,3'-diethylthiotricarbocyanine salt crystals of 10,12-pentacosadiynoic acid settles to the bottom of the reaction flask. The product is recovered by filtration, washed with water and dried.

In a glass beaker 15 g. of deionized photographic grade gelatin solution in 0.6 g. of ALKANOL XC$^{(1)}$ and 250 g. of water is prepared and subjected to high shear mixing at about 70° C. To the mixing zone, over a 30 second period, is added 15 g. of the polycarbocyanine pentacosadiynoic acid salt crystals and mixing is continued for an additional 5 minutes. The resulting mixture is cooled to 40° C. and then poured into stainless steel containers and chill set at about 4° C. The resulting gelled dispersion is then placed in a vacuum oven at about 20° C. and evacuated to about 5 torr pressure for a time sufficient to undergo a 60 g. weight loss. The gelled dispersion is then reconstituted at 50° C. by adding 60 g. of water to replace the liquid lost in drying.

EXAMPLE 2

The reconstituted dispersion of Example 1 is coated and dried on 3 mil polyester film base to provide a film layer having a dry thickness of about 1.5 um. The coated surface film is then exposed to emission from a GaAlAs semi-conductor diode laser with a wavelength of about 830 nm. The laser emission is focused onto the surface of the film and scanned across the surface at the rate of about 300 cm/sec. in a desired cross hatched pattern. The power output of the laser varies in the range of from about 3 mJ/Cm$^2$ to about 5 J/cm$^2$. No pattern is discerned from the laser transmitted light; however a corresponding cross hatched latent image is encoded on the coating. When the film is subsequently exposed to short wavelength UV radiation the latent image of the original laser exposure is strongly visible as colorless cross hatched image against a permanent blue background with a visual contrast exceeding 1.5 du. The pattern is extremely well defined and of very high resolution and edge acuity, indicating that the film and imaging process are suitable for high resolution imaging or digital data recording.

EXAMPLE 3

Example 1 is repeated except that the 10,12-pentacosadiynoic acid reactant is homopolymerized by exposure to UV light prior to contact with 3,3'-diethylthiatricarbocyanine iodide and the resulting blue product is the 3,3'-diethylthiatricarbocyanine salt of the 10,12-pentacosadiynoic acid homopolymer having a blue color.

EXAMPLE 4

The reconstituted dispersion of Example 3 is then coated on a 2 mil glass plate and dried to provide a blue film layer of about 2 um thickness. The coated film is exposed to emission from a GaAlAs semiconductor diode laser according to the procedure described in Example 2. In this case however, the blue film undergoes an immediate and permanent color change (to red) in the imaged portions impinged by the laser and the desired visual pattern is produced directly in high acuity without further exposures to radiation.

In the above Example 1, substitution of the polycarbocyanine salt with a pyrylium dye salt, e.g. 4-(4-dimethylaminophenyl)-2,6-diphenylpyrylium sulfate

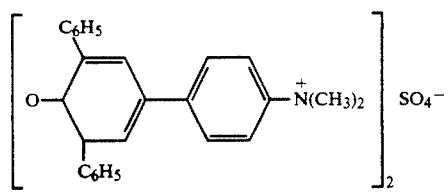

or a squarylium dye inner salt, e.g. squarylium dye 3

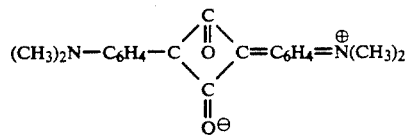

or of the other aforementioned dyes capable of absorbing radiation energy within the 600-1500 wavelength range and selection of an imaging light source generating energy in the same wavelength as the dye results in similar high quality images following the procedure of Example 2. Similarly substitution of said dyes and light source in Example 3 and following the procedure of Example 4 provides a permanent contrasting colored pattern of similar high quality.

In the above Examples, it is also to be understood that other cationic polyacetylenes e.g. 2,4-hexadiyn-1-carboxyl-6-isopropyl carbamate; 2,5-octadiyn-1-methylsulfonate-8-(n-propyl urea); 2,4-hexadiyn-1-butyl thioic-8-(isopropyl carbamate) and the like or homopolymers thereof, can be employed to replace the 10,12-pentacosadiynoic acid reactant and the resulting films imaged in high resolution and color contrast following the general procedure of Example 2 or 4.

What is claimed is:

1. A thermosensitive polyacetylene dye salt having a thermal sensitivity above 50° C. and capable of directly absorbing radiation energy generated at a wavelength from about 400 nm to about 1,500 nm whereupon an immediate visual image in a permanent color is encoded thereon.

2. The salt of claim 1 which is the reaction product of a cyclic dye compound; capable of absorbing energy in a wavelength from about 400 nm to 1,500 nm and a conjugated cationic polyacetylene compound containing from 2 to 4 acetylene groups.

3. The salt of claim 2 wherein said conjugated cationic polyacetylene is a diacetylene having at least one carboxyl group or a homopolymer thereof.

4. The salt of claim 2 wherein said cyclic dye compound is a quaternized N-heterocyclic dye.

5. The salt of claim 4 wherein said dye compound is selected from the group of a polycarbocyanine, squarylium, betain and pyrylium dye.

6. The polyacetylene dye salt of claim 1 defined by the formula

wherein X is an N-quaternized radical of a dye having an optical absorbance in a wavelength of from about 600 to about 1,500 nm; V is the cationic residue of carboxyl, thiolic, thionic, thioate, sulfonate or phosphonate and X' is selected from the group XV, hydrogen, $C_4$ to $C_{25}$ alkyl or a polar hydrophilic radical capable of promoting hydrogen bonding.

7. The salt of claim 5 wherein said dye compound is a polycarbocyanine and is 3,3'-diethylthiatricarbocyanine iodide.

8. A substrate coated to a thickness of from about 1.5 to about 5 um with the compound of any one of claims 1, 5 or 6.

* * * * *